United States Patent [19]

Richmond

[11] Patent Number: 4,964,359
[45] Date of Patent: Oct. 23, 1990

[54] AUTOMOTIVE GEARSHIFT INDICATOR

[75] Inventor: James W. Richmond, Carmel, Ind.

[73] Assignee: Emhart Industries, Inc., Towson, Md.

[21] Appl. No.: 288,226

[22] Filed: Dec. 22, 1988

[51] Int. Cl.⁵ .............................................. G09F 9/00
[52] U.S. Cl. ............................ 116/28.1; 116/DIG. 20
[58] Field of Search ............ 116/28 R, 278, 320–323, 116/335, 327, 329, 306, 320, DIG. 3, DIG. 35, DIG. 36, DIG. 20, 328

[56] References Cited

U.S. PATENT DOCUMENTS

| | | | |
|---|---|---|---|
| 4,027,361 | 6/1977 | Yoneya | 116/DIG. 20 |
| 4,191,064 | 3/1980 | Houk et al. | 116/DIG. 20 |
| 4,505,324 | 3/1985 | Hildebrand et al. | 116/DIG. 20 |
| 4,515,033 | 5/1985 | Carlo | 116/DIG. 20 |
| 4,565,151 | 1/1986 | Buma | 116/DIG. 20 |
| 4,566,399 | 1/1986 | Hildebrand et al. | 116/28.1 |
| 4,798,160 | 11/1989 | Mochida et al. | 116/DIG. 20 X |

FOREIGN PATENT DOCUMENTS 2288640  5/1976  France ............................. 116/28.1

Primary Examiner—William A. Cuchlinski, Jr.
Assistant Examiner—Scott Cummings
Attorney, Agent, or Firm—Edward D. Murphy

[57] ABSTRACT

An indicator housing has a window in it and an aperature for passing a gearshift lever through it. There is a light guide having indicia on it which are viewable in the window, an indicating arm, and a metal tape closing the aperature in the housing, connecting the indicating arm to the gearshift lever, and supporting the indicating arm for movement along a first axis parallel to the light guide over a range that permits it to be visually aligned in the window with the indicia to indicate the lever position. The tape has two openings in it along an edge and the indicating arm has two pins. The housing includes a body portion and a cover portion. When the cover is secured to the body, the arm is trapped between the cover and tape in a direction perpendicular to the first axis, with the pins in the openings, thereby securing the arm to the tape.

7 Claims, 7 Drawing Sheets

AUTOMOTIVE GEARSHIFT INDICATOR

BACKGROUND OF THE INVENTION

1. Field of the Invention.

The invention in general relates to automotive gearshift indicators, sometimes referred to as PRNDL's (Park, Reverse, Neutral, Drive, Low) in the automotive field, and more particularly to a floor mounted gearshift indicator mechanism that is entirely enclosed in the indicator housing and connects to the gearshift lever.

2. Description of the Prior Art.

Automotive gearshift indicators have been used in the industry to indicate the position of the gearshift lever, especially of automatic transmissions, for at least fifty years. These gearshift lever position indicators must be lighted to be visible at night and be reliable, which are also requirements for many non-automotive indicators. In addition these automotive indicators must be able to tolerate the relatively large forces associated with automotive gear shifts and be compatible with automotive assembly techniques, i.e. they should be installable in the automobile as a unit and with minimal operations. Generally floor mounted gearshift position indicators have comprised a fixed, lighted set of indicia and a mechanical indicating arm which is coupled to the gearshift mechanism. These prior art indicator mechanisms also generally used a flexible boot to house and seal the gearshift lever. To avoid unsightly external connections, or for other reasons, the indicator arm passed through a slot in the housing, under the indicator, and connected internally to the gearshift mechanism. This arrangement made it difficult to coordinate the indicator position with the shift lever position. More recently, an entirely enclosed gearshift indicator has been designed which utilizes an electronic "gear indicator arm" comprising a separate electro-luminescent lamp for each indicator position and an electrical switch activated by the gearshift lever which lights the appropriate one of the lamps. These indicators have used a flexible steel tape to close the slot in the indicator housing through which the shift lever extends. The housing and tape combination entirely enclosed the indicator mechanism and sealed it against entry of foreign particles except for a narrow slot through which the tape moved. While these indicators have the advantages of being totally enclosed, essentially sealed against foreign particles, have switching mechanisms that are connected directly to the gearshift lever, and present a more visible and aesthetically pleasing display, the electronic system is more complex and prone to failure than the prior mechanical system.

SUMMARY OF THE INVENTION

It is an object of the invention to provide a gearshift lever indicating mechanism that provides an indicator mechanism directly connected to the gearshift lever, the ease of viewability as of prior art electronic gearshift indicators, and the simplicity and reliability of mechanical gearshift mechanisms.

It is another object of the invention to provide the above object in a gearshift indicator that is inexpensive to manufacture.

It is a further object of the invention to provide one or more of the above objects in a gearshift lever mechanism in which a sliding tape is used to close the aperture in the indicator housing through which the gearshift lever extends and also to connect the indicator arm to the gearshift mechanism.

It is yet a further object of the invention to provide one or more of the above objects in a gearshift indicator mechanism that can be lighted to provide an appearance that is as aesthetically pleasing as prior art electronic gearshift mechanisms.

The invention provides a gearshift lever operating position indicating mechanism comprising: a housing having a window in it and having aperture means for passing the shift lever through it; indicia means for labeling the operating positions of the gearshift lever, the indicia means being viewable in the window and including a plurality of indicia; an indicating arm; arm support means for movably supporting the indicating arm within the housing over a range of movement that permits it to be visually aligned in the window with the plurality of indicia; and tape means for moving with the lever to close the aperture means and for connecting the arm to the gearshift lever, whereby the arm moves with the lever to indicate the operating position of the lever. Put in another way, the tape means may be seen as part of the arm support means. In this view, the support means includes tape means for moving with the lever to close the aperture means and for connecting the arm to the lever. Preferably the housing includes a body portion and a cover portion and the arm support means further includes: tape support means for permitting movement of the tape along an axis while relatively rigidly supporting it in a first direction perpendicular to the axis; a flange integrally formed with and at right angles to the arm; channel means extending from the tape to the cover for receiving the flange, fastening means for securing the cover to the body and preventing movement of the flange in a direction opposite to the first direction, whereby the flange is constrained to move in the channel between the cover and the tape thereby supporting the arm while permitting it to move along the axis. Preferably, the housing includes a body portion and a cover portion and the arm support means includes means for securing the arm to the tape when the cover portion is secured to the body portion. Preferably, the tape is movable along an axis, and the means for securing comprises means for constraining the movement of the arm in a direction perpendicular to the axis. Preferably the means for securing includes a pin connected to the arm and an opening in the tape for receiving the pin. Preferably, the means for securing further includes a flange integrally formed with and connecting the arm and pin. Preferably, the arm is made of a light transmitting material and the mechanism further includes a light source. Preferably, the arm support means includes guide means for guiding light from the source into the arm and for mechanically guiding the movement of the arm, wherein both the light guiding function and the mechanical guiding function are performed by the same parts.

The gearshift indicator according to the invention is not only completely enclosed and as aesthetically pleasing to view as the recent electronic indicators, and as simple and reliable as the older mechanical indicators, but is also simple to manufacture and much easier to install and service than prior art indicator mechanisms. Numerous other features, objects and advantages of the invention will become apparent from the following detailed description when read in conjunction with the accompanying drawings.

DESCRIPTION OF THE PREFERRED EMBODIMENT

Figure 1:
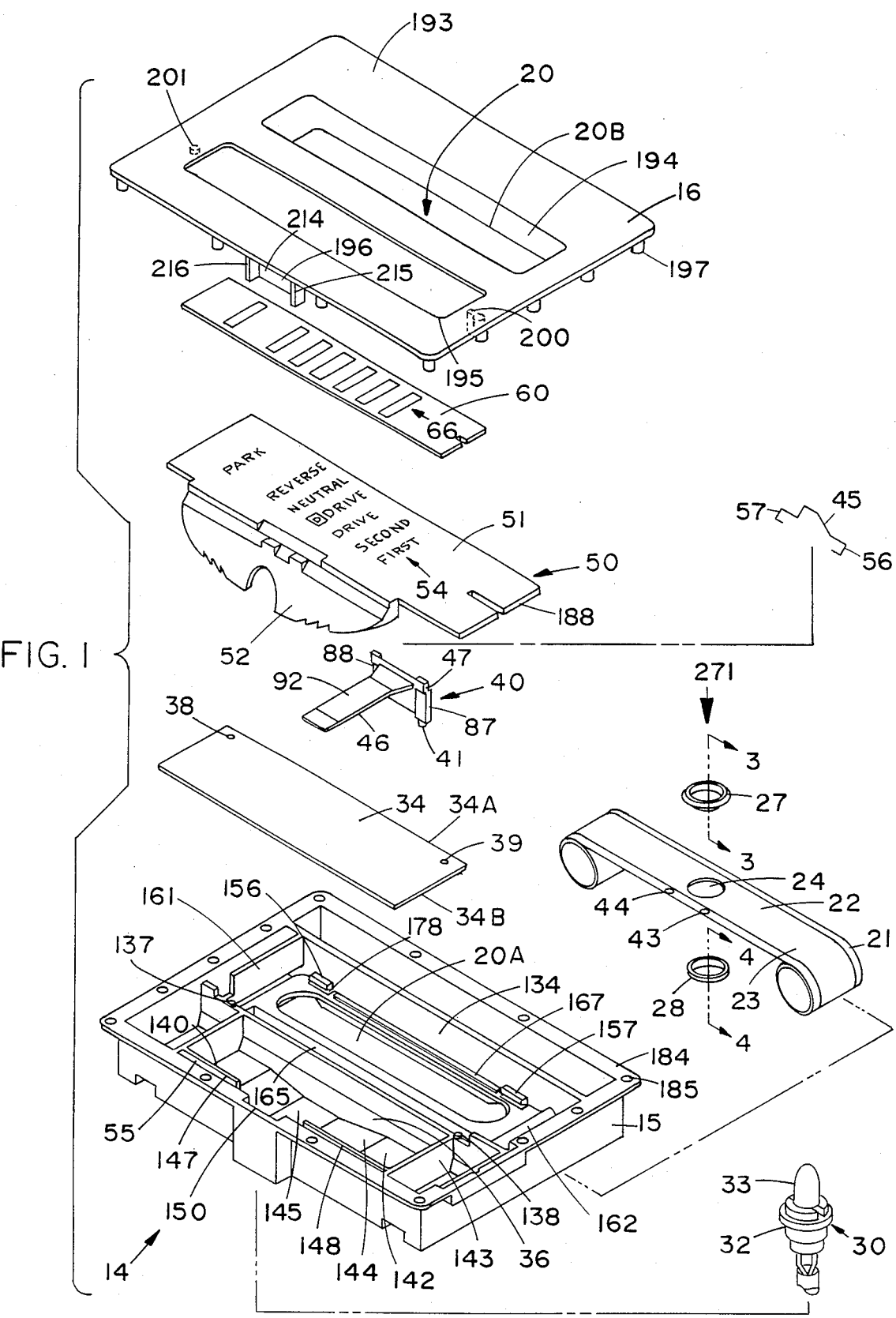
FIG. 1 is an exploded view of the preferred embodiment of the invention.
Figure 7:
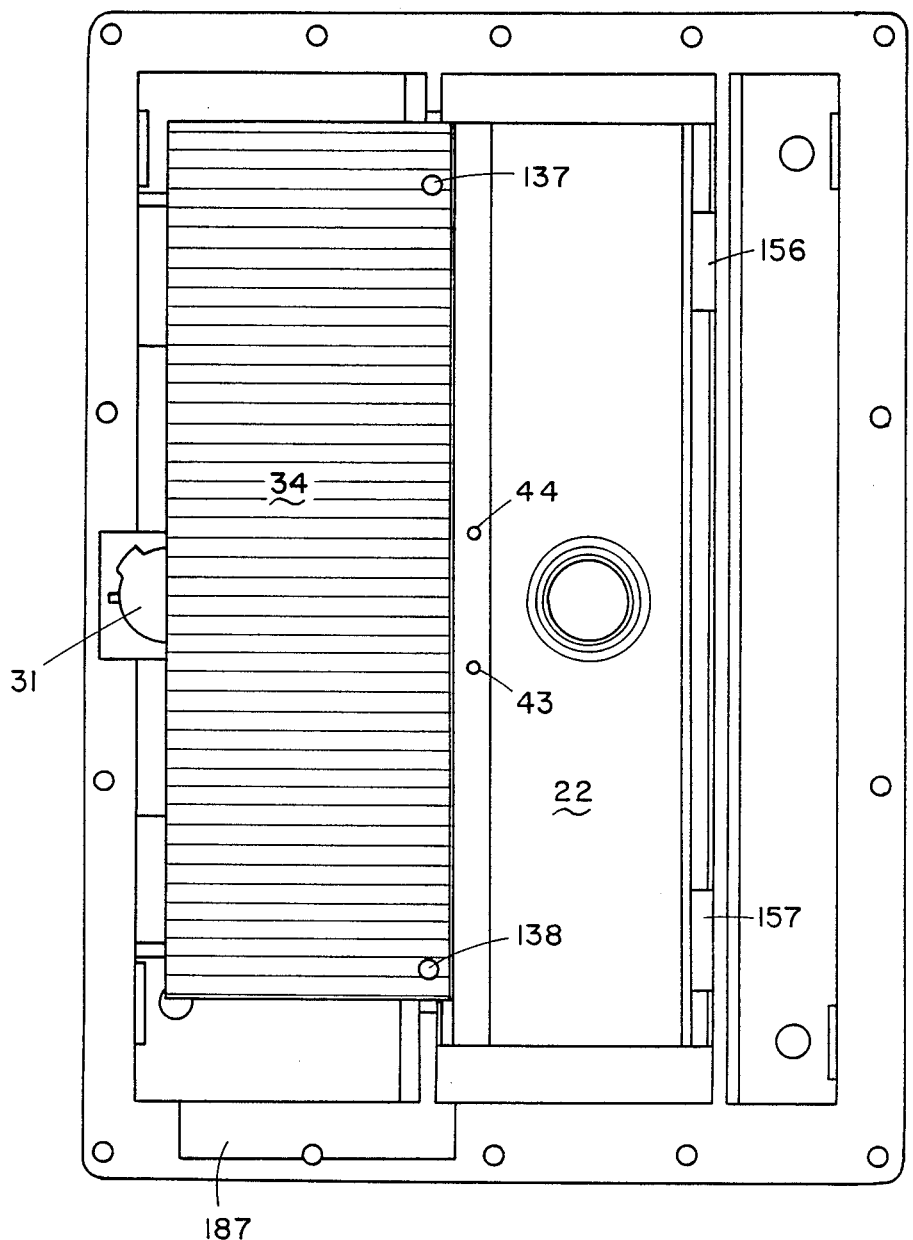
FIG. 7 is a top plane view of the embodiment of FIG. 1 with the housing cover removed.

Directing attention to FIG. 1, an exploded view of the preferred embodiment of a gearshift lever operating position indicating mechanism according to the invention is shown. The mechanism comprises a housing 14 including a body portion 15 and a cover portion 16. The housing 14 has an aperture means 20 for passing the gearshift lever (not shown) through the housing. The aperture means 20 is closed by a flexible tape 22. The tape 22 has a hole 24 through which the gearshift lever passes and is secured to the lever by a bushing 27 and a retainer 28. A light 30 fits into a socket 31 (FIG. 7) in the bottom of housing body 15, and a diffuser 34 fits over a light box 36 in body 15. Indicator member 40 comprises an indicating arm 46 and an arm support flange 47. Pins 41 and 42 on indicator member 40 fit into openings 43 and 44 respectively in tape 22, the hooked ends 56 and 57 of spring 45 fit over the legs 87 and 88 of indicator member 40, respectively, and light guide 50 means fits over the diffuser 34 and indicator member 40, and spring 45. The light guide means 50 comprises an indicia light guide 51 and a main light guide 52. The main light guide 52 fits into a slot 55 in body 15 and directs light to both the indicia light guide 51 and the indicating arm 46. A lens 60 fits between light guide means 50 and cover 16. The tape 22 slides with the shift lever and moves the arm 46 behind the appropriate one of indicia 54. The diffuser provides a first background color, such as blue-green to set off the indicia. The arm 46 is illuminated in a second color contrasting with the first color, such as orange-red, to indicate the operating position of the gearshift lever. The indicia 54 are illuminated in a third color, such as white, contrasting with both the first and second colors. The various parts shown in FIG. 1 will be discussed in more detail below. However, it should be understood that this discussion is intended to be exemplary only and the parts may be made in many other shapes and sizes and of other materials than those described.

Figure 3:
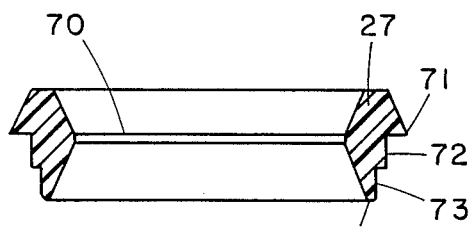
FIG. 3 is a cross-sectional view of the preferred tape bushing taken through line 3—3 of FIG. 1.
Figure 4:
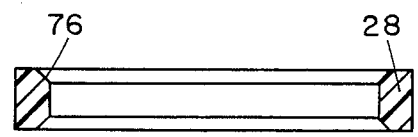
FIG. 4 is a cross-sectional view of the preferred bushing retainer ring taken through line 4—4 of FIG. 1.
Figure 5:
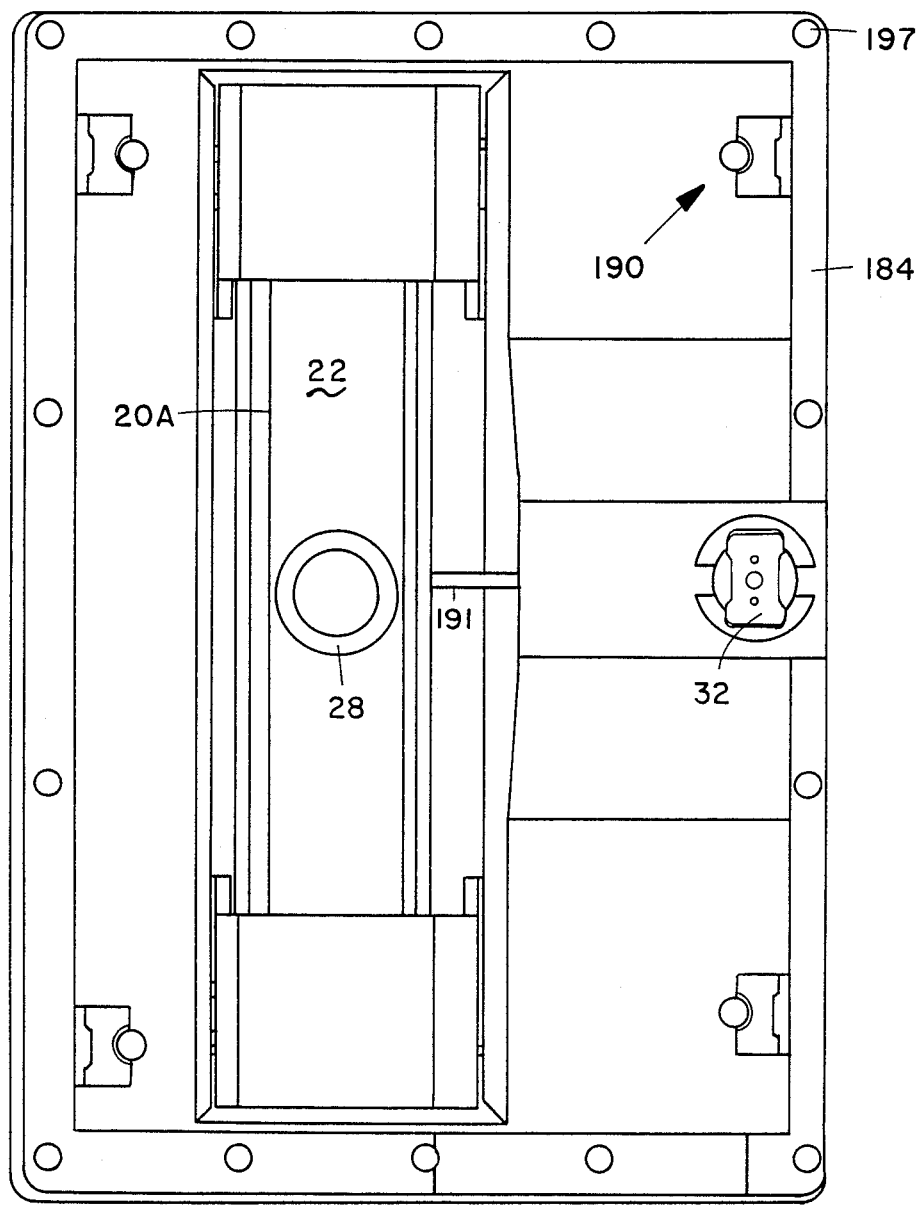
FIG. 5 is a bottom plane view of the embodiment of FIG. 1.
Figure 6:
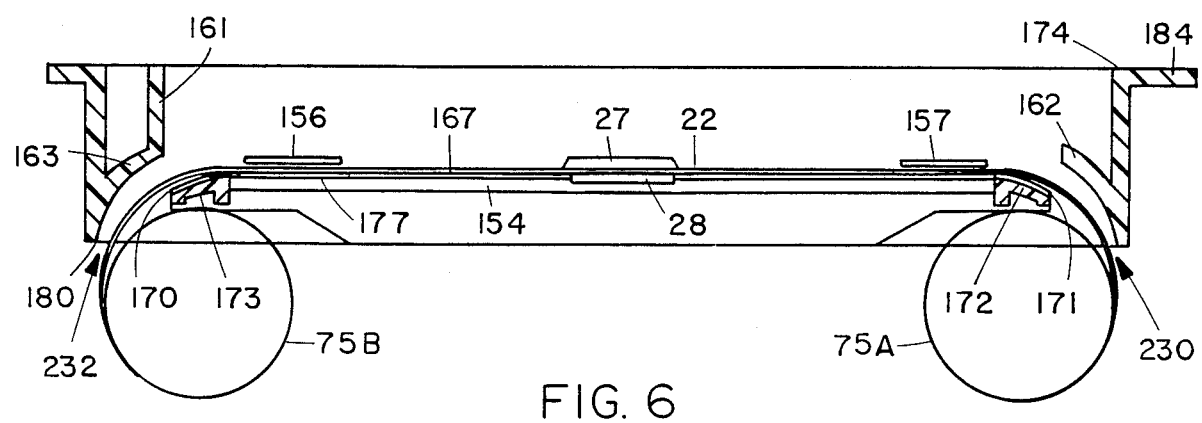
FIG. 6 is a cross-sectional view of the housing body and tape taken through line 6—6 of FIG. 2.

Turning now to a more detailed description of the various parts of the invention, flexible tape 22 is perhaps best seen in FIGS. 1 and 6. Tape 22 comprises a steel tape portion 21 and a plastic tape portion 23. Tape portion 21 is type 301 stainless steel, 0.005 inches thick tempered to about RC 50. It is 1.740 inches wide by 20 inches long. Tape portion 23 is made of 0.004 inch thick adhesive-backed, vinyl plastic, is preferably black, and may have a glossy or stippled finish. It is 1.25 inches wide by 20 inches long. It is bonded to the metal tape 21 by the adhesive at a location 0.165 inches from the side toward the upper right in FIG. 1, leaving a wider bare metal strip on the other side (the side with openings 43 and 44). To assist in manufacturing, one end of the metal-vinyl tape 22 is rounded in a 1.75 inch radius and has a 0.125 inch diameter hole centered 0.19 inches from the rounded end and centered between the long sides. A 0.715 inch hole 24 is formed in the center of the tape 22 (10 inches from each end). Openings 43 and 44 are each 0.105 inches in diameter and are centered 0.190 inches in from the near edge of the tape 22 and 0.500 inches on either side of the center line across the width of the tape. The tape 22 is coiled so that it has a 1.12 inch inner diameter in the free state. Bushing 27 and retainer 28 are both made of Celanese ™ 1310-4 nylon, preferably black. Bushing 27 has an inner ring 70 0.547 inches in diameter which is 0.015 inches high in the vertical direction in FIG. 3. The bushing is 0.215 inches in total height and tapers outward from ring 70 to an inner diameter of 0.620 inches. The outer diameter at the top (in FIG. 3) is 0.717 inches and the bushing tapers downward to a rim 71 of diameter 0.790 inches which is 0.090 inches from the top end. It then steps down into a neck 72 of outside diameter 0.710 inches and 0.165 inches in height, and then again to a neck 73 of 0.675 inches in outside diameter. The inner diameter 74 of the lower end is 0.635 inches, and preferably the lower outside rim has a 0.010 inch×45° chamfer. Retainer ring 28 is 0.120 inches in the vertical direction in FIG. 4, has an outer diameter of 0.690 inches, and an inner diameter of 0.680 inches. The intermediate diameter at the top and bottom is 0.720 inches and the inward chamfer, at 76 for example, is 45°.

Diffuser 34 (FIG. 1) comprises a 0.030 inch thick polycarbonate plate 1.826 inches wide and 5.710 inches long. It has two holes 38 and 39 which are each 0.109 inches in diameter and centered 0.150 inches from the edge 34A of the plate. Hole 39 is centered 0.240 inches from edge 34B and hole 38 is 5.15 inches, center-to-center, from hole 39. The polycarbonate plate is screen painted on the lower surface so as to produce a blue-green tint for transmitted light and to provide even light transmission when illuminated from light within light box 36. The diffuser 34 is lined for blue in FIG. 7 as this is closest to its color.

Figure 10A:
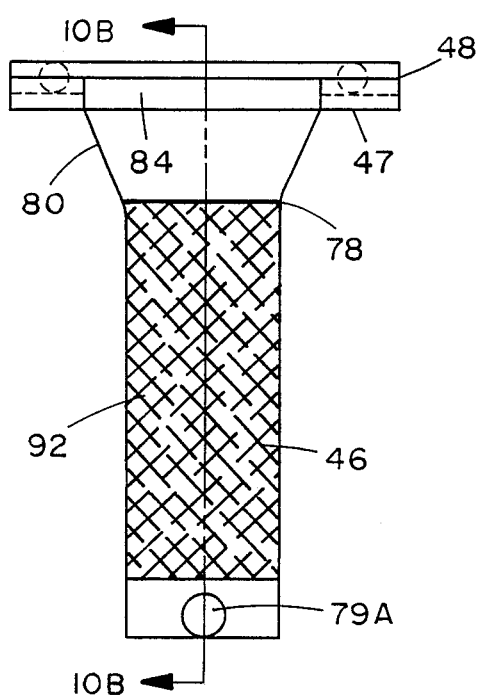
FIGS. 10A, 10C and 10D are top, left side, and bottom views respectively of the preferred indicator member.
Figure 10B:
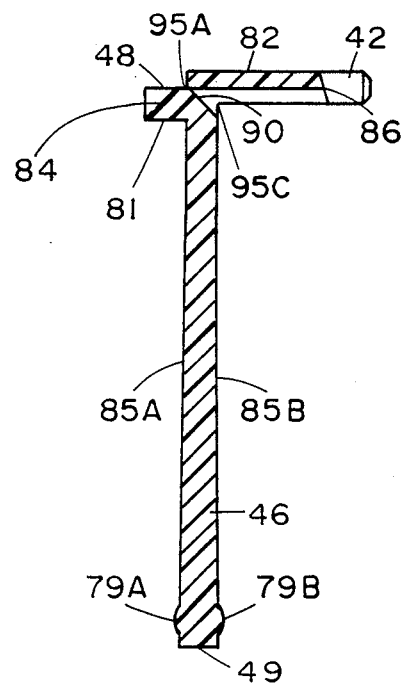
FIG. 10B is a cross-sectional side view taken through line 10B—10B of FIG. 10A.
Figure 10C:
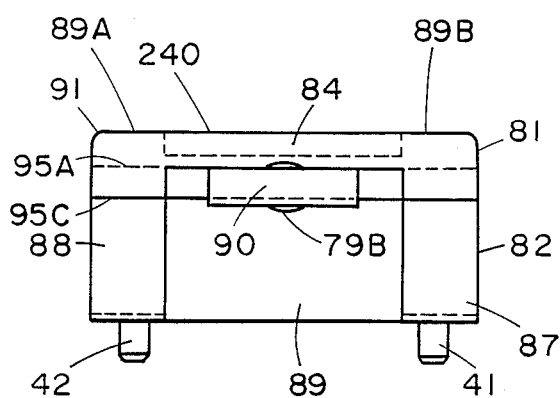
Figure 10D:
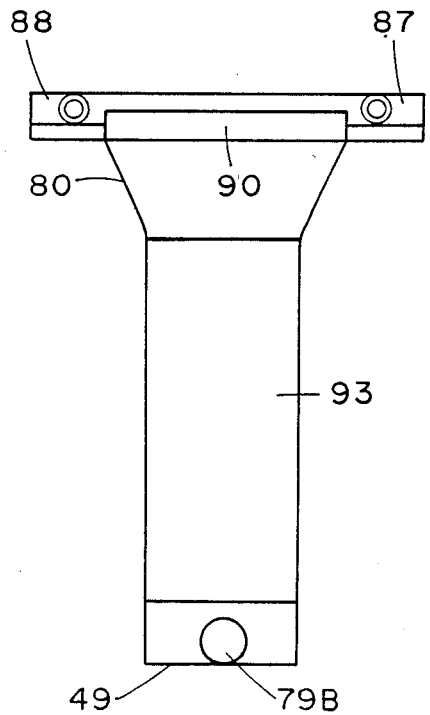

Indicating member 40 is best shown in FIGS. 10A–10D. It is made of clear, high-temperature acrylic plastic. It includes an indicating arm portion 46 and a flange portion 47. The arm 46 is 1.820 inches long from the edge 48 to the distal end 49 and 0.500 inches wide from the distal end to a point about 1.315 inches from the distal end, then tapers outward at 25° to a width of 0.800 inches to form a funnel portion 80. The area 78 on both sides where the taper begins is rounded in a 0.300 inch radius. At the distal end 49, arm 46 is 0.135 inches thick which thickness continues to a point 0.515 inches from the distal end, where it begins to taper inward to a thickness of 0.100 inches at a point 1.315 inches from the distal end where it then continues to flange 47 without varying the 0.100 inch thickness. The points where the taper begins and ends are blended so there is no visible line of intersection. A pair of bosses 79A and 79B of 0.150 inch diameter are formed at the center of the distal end 49. The bosses bulge out about 0.010 inches from the surfaces of the arm 46. Flange 47 is integrally formed with and at right angles to arm 46. It is 1.300 inches wide (the horizontal direction in FIG. 10C) and 0.630 inches high (the vertical direction in FIG. 10C) from the upper edge 240 to the pins 41 and 42. It comprises an upper portion 81 and a lower portion 82. The upper portion 81 (FIG. 10B) is 0.100 inches thick and has a prism portion 84 that extends the width of arm 46 and is angled at 45° to the surface 85A of arm 46. The lower portion 82 extends from the upper surface 85A of arm 46 0.505 inches to pins 41 and 42. The lower surface 86 of the flange portion 82 is angled at 15° to the vertical. Flange 82 comprises two thicker legs 87 and 88 (FIG. 10C) which are 0.100 inches thick and a thinner interior area 89 which is 0.50 inches thick. Another prism 90 (FIG. 10B) is formed where this thinner area 89 meets the arm funnel 80. Prism 90 is 45° with the horizontal and vertical in FIG. 10B. The upper corners, such as 91 (FIG. 10C), of flange 81 are rounded with a 0.040 inch radius. Pins 41 and 42 are each 0.100 inches in diameter and 0.140 inches long with 0.020 inch×45° chamfers about their distal edges. They are spaced 1.000 inches center-to-center. Pin 42 is centered 0.460 inches from the center line of arm 46, and in the other direction (the vertical on FIG. 10D) the pins are centered on the center line of legs 87 and 88. The area 92 of surface 85A starting 0.19 inches from distal end 49 and extending for 1.250 inches is screen painted, preferably a translucent orange-red color. In FIG. 10A this area is lined for orange as the color is closest to this. The corresponding area 93 on surface 85B is screen painted white.

Figure 9A:
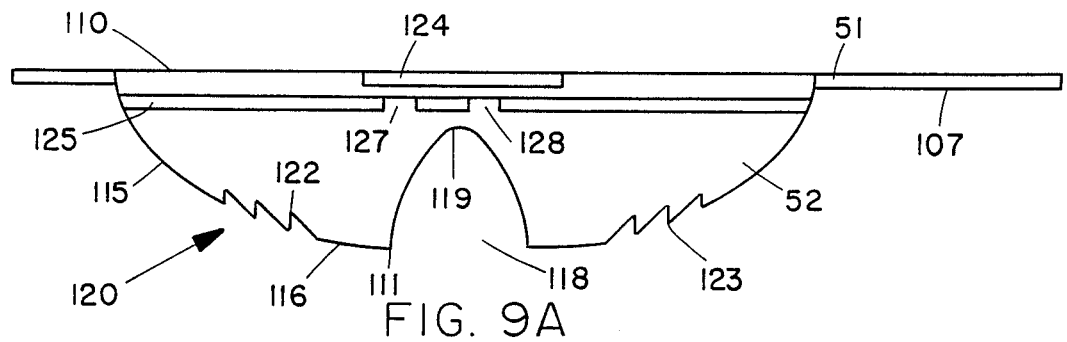
FIGS. 9A and 9B are side and top views respectively of the preferred light guide.
Figure 9B:
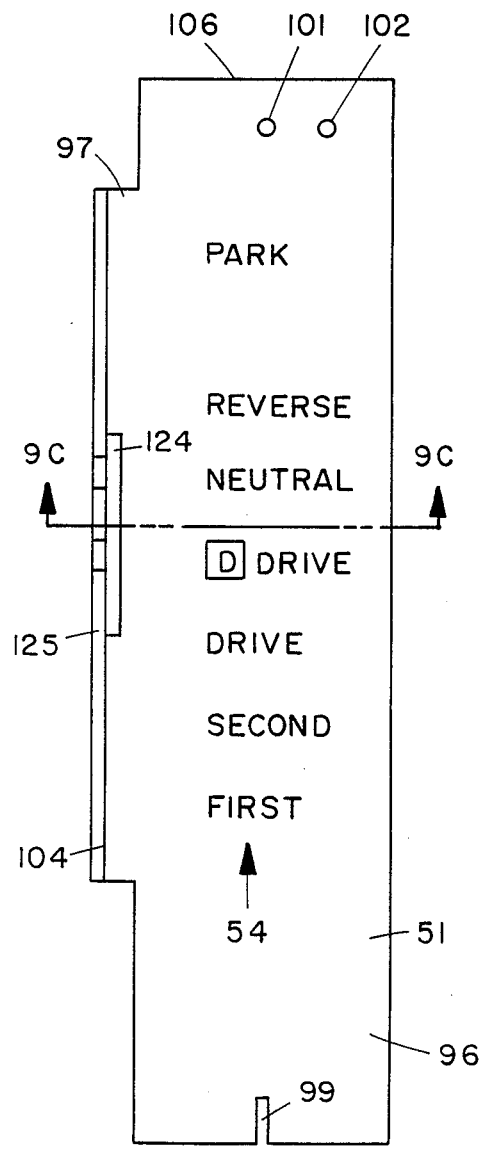
Figure 9C:
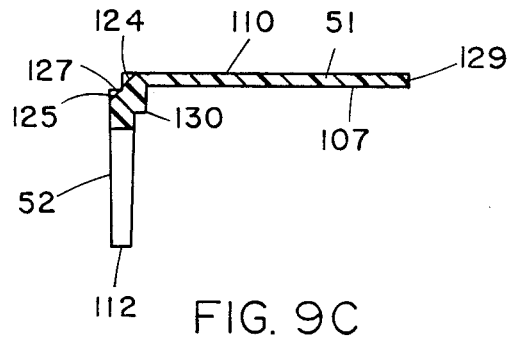
FIG. 9C is a cross-section of the light guide taken through line 9C—9C of FIG. 9B.
Figure 9D:
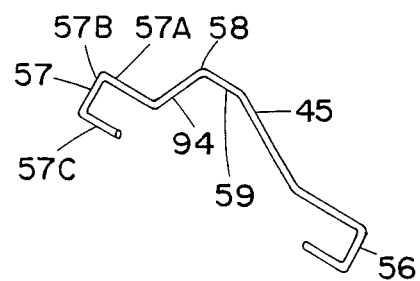
FIG. 9D is an enlargement of the three-quarter perspective view of the anti-rattle spring of FIG. 1.
Figure 11:
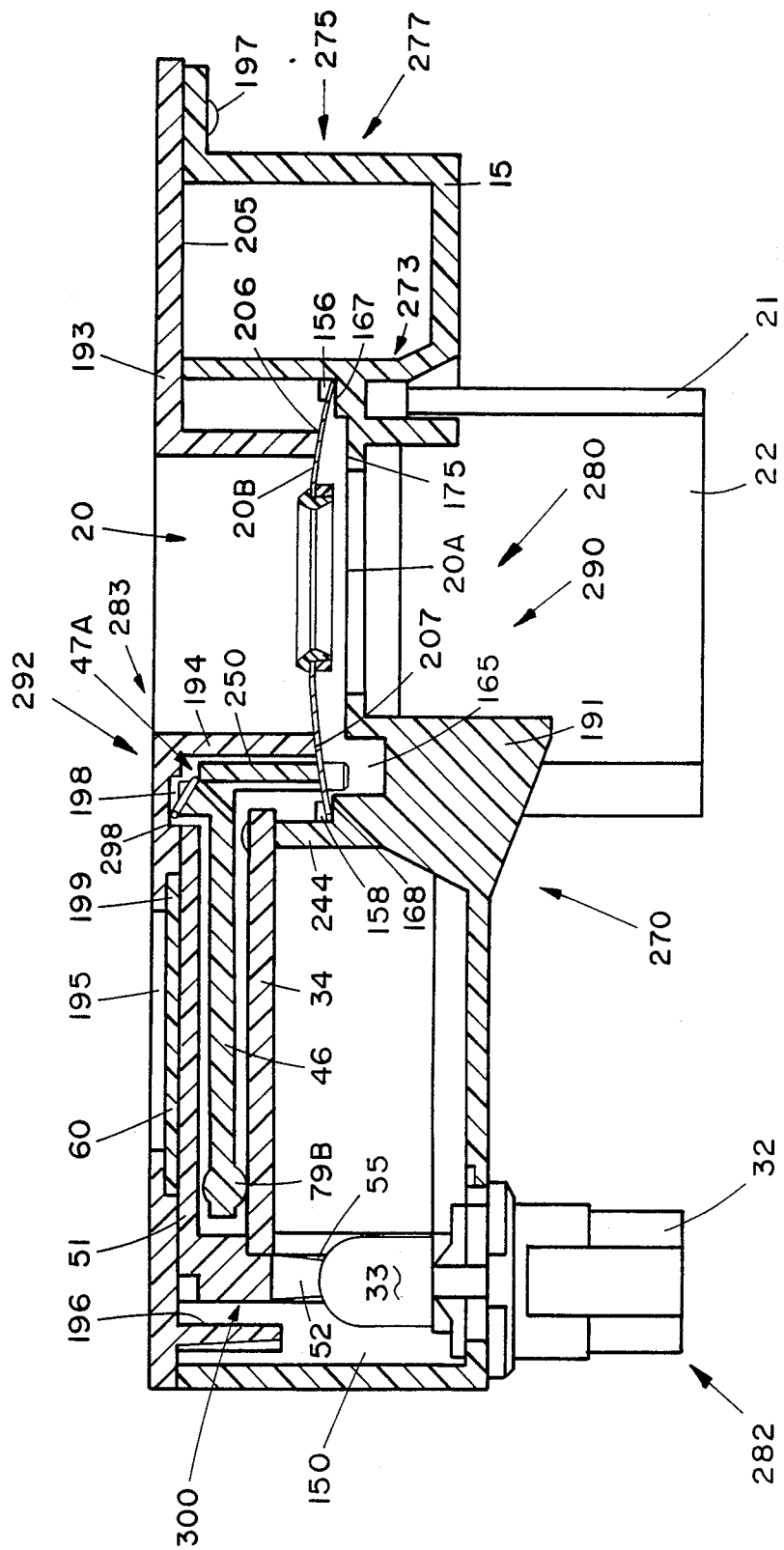
FIG. 11 is a cross-sectional view of the embodiment of FIG. 1 through line 11—11 of FIG. 2.

Spring 45 is shown in FIGS. 1, 9D and 11. It is made of 0.013 inch diameter spring steel. It comprises hooked ends 56 and 57 and a V-shaped portion 58 joining the ends. It is symmetrical about the middle of the V-shaped portion 58 and thus only the dimensions of one side will be discussed. The V 58 comprises a central part 59 and two side parts, such as 94. The central part 59 is .15 inches long and the side part 94 is 0.31 inches long, the two parts 59 and 94 joining at a 45° angle. Hook 57 comprises a portion 57A 0.37 inches long, a portion 57B 0.135 inches long, and a portion 57C 0.12 inches long. Portion 57A connects to part 94 at a 45° angle, the portions 57A and 57B of the hook 57 join at a 90° angle, and the portions 57B and 57C join at slightly less than 90°. The plane of the V 58 makes a 96° angle with the plane of the hook 57. All angles given above are in the unstressed condition.

Light guide 50 is shown in FIGS. 9A–9C and is also made of clear, high-temperature acrylic plastic. The integrally molded piece can be best understood if divided into two sections, indicia light guide 51 and main light guide 52. The main light guide 52 is smaller that the indicia light guide 51, but it serves to guide light to both the indicia light guide 51 and the indicator member 40, hence the terminology. The indicia light guide 51 is 0.090 inches thick and includes a rectangular plate 96 which is 6.400 inches long by 1.682 inches wide and a flange 97 which is 4.57 inches long by 0.206 inches wide. A slot 99 0.065 inches wide by 0.345 inches long is centered on a line 1.046 inches from edge 104 of flange 97. Two holes 101 and 102 are centered 0.500 inches from the opposite end 106. Hole 101 is 0.095 inches in diameter and centered on the line 1.046 inches from edge 104 and the two holes 101 and 102 are spaced 0.400 inches apart center-to-center. Hole 102 is 0.115 inches in diameter. Indicia 54 are screen printed on the back side 107 of guide 51. These indicia are "PARK", "REVERSE", "NEUTRAL", "D", "DRIVE", "DRIVE", "SECOND" and "FIRST" in the preferred embodiment. The distance from the center line of holes 101 and 102 to the top of each of the indicia are 0.880 inches, 1.830 inches, 2.340 inches, 2.880 inches, 3.450 inches, 4.020 inches, and 4.600 inches respectively. The first letters of each of the indicia are aligned along a line 0.666 inches from edge 104. The letters are 0.138 inches high. Main light guide 52 is 1.160 inches long from its distal end 111 to the upper surface 110 of flange 97. Guide 52 is 0.130 inches thick at its distal end 112 and tapers to about 0.155 inches at its upper end. It is 4.57 inches wide where it meets flange 97 and curves initially in the area 115 in a 0.880 inch radius which blends into a 2.290 inch radius to form the area 116. It has a central slot 118 which is formed by three radii: one of radius 0.190 inches forming the inner end 119 blending into two of radii 1.00 inch forming the sides. Three serrations 120 are formed in each of the 2.290 inch radius areas, such as 116, the two sets of serrations equally spaced on either side of slot 118. Serrations 120 are defined by lines sloped at 45° to the vertical meeting vertical lines, with the meeting points, such as 122, rounded in a 0.020 inch radius and the tips, such as 123, rounded in a 0.010 inch radius. The vertical lines defining the serrations are spaced 1.59 inches, 1.37 inches, and 1.15 inches respectively from the center line of slot 118, and the leading edge of the closest serration to slot 118 is 0.930 inches from the same center line. Prisms 124 and 125 are formed at the juncture of the flange 97 and main guide 52. Each are angled 45° from the vertical. Prism surface 124 is 1.300 inches long and is centered on the center-line of slot 119. Prism 125 extends the width of guide 52 except where two extensions 127 and 128 are formed. The upper end of projection 127 (FIG. 9A), which defines both the projection and the prism, is 0.140 inches vertically from the upper surface 110 of guide 51 and is 0.090 inches wide in the horizontal direction. Another step-like extension 130 is formed on the interior juncture of main guide 52 and indicia guide 51, which extension is 0.090 inches wide and rises 0.175 inches vertically to lower surface 107 of guide 51. Thus extensions 127 and 128 overlap 0.050 inches with extension 130. Extension 130 extends the width of main guide 52. The indicia 54 are screen painted in white paint on the surface 107 of guide 51. The entire bottom edge of guide 52 formed by areas 115, 116, the edges of serrations 120 and the edge of slot 118, is given a coarse dull matt finish to specularly reflect light.

Figure 8:
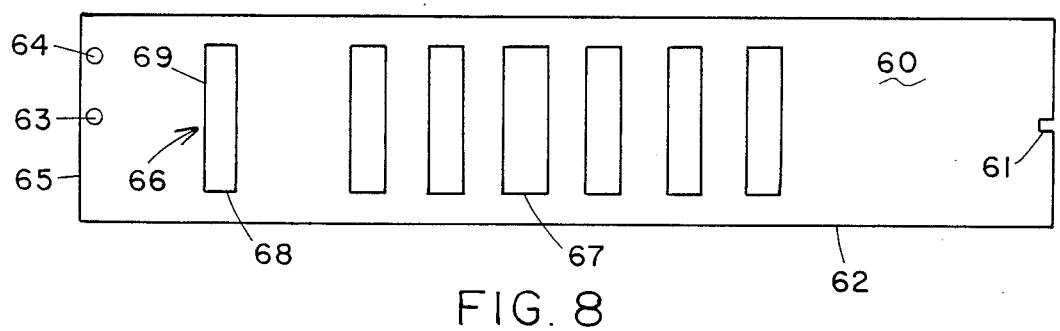
FIG. 8 is a plane view of the preferred indicator lens.

Lens 60 is shown in FIG. 8. It comprises a 0.020 inch thick sheet of clear polycarbonate, 6.260 inches long and 1.260 inches wide. A slot 61 0.065 inches wide and 0.115 inches deep is centered on a reference line 0.630 inches from edge 62. Two holes 63 and 64 are centered on a line 0.090 inches from end 65. Hole 63 is 0.095 inches in diameter and is centered on the above-mentioned reference line. Hole 64 is 0.109 inches in diameter and is 0.400 inches center-to-center from hole 63. The lower surface (in FIG. 1) of lens 60 is screen painted opaque black except for the seven rectangular window panes 66 which are left clear. The rectangular window panes are each 0.236 inches wide by 0.970 inches long, except for the fourth window pane 67 which is 0.315 inches wide. The edges, such as 68, are aligned along a line 0.475 inches from the reference line. The edges, such as 69, nearest end 65 of each window pane are spaced 0.860 inches, 1.810 inches, 2.320 inches, 2.821 inches, 3.430 inches, 4.000 inches, and 4.580 inches respectively from the line through the centers of holes 63 and 64.

Light 30 comprises a commercially available socket 32 and bulb 33. The socket 32 is a type JKL 2961-14.25 socket and lead assembly which may be purchased from JKL Components Corporation, Pacoima, California. Bulb 33 is a Stanley type JKL 194 and may be purchased from the same source.

Housing body portion 15 is shown in FIGS. 1, 5, 6, 7 and 11. It is made of Calanese TM N276 nylon, mineral-glass filled, and containing sufficient titanium oxide pigment to achieve an opaque white color. It is roughly a box of interior dimensions 6.67 inches long, 4.540 inches wide and 1.030 inches deep with a typical wall thickness of 0.090 inches. The exact overall dimensions are not critical, depending more on the automobile manufacturer's preference and well-known engineering factors, such as material strengths, and therefore will not be discussed in detail. Rather the focus will be on the portions that play active roles in the invention. These include light box 36, light guide channel 55, and tape compartment 134. Light box 36 is 4.810 inches long in interior dimensions, and the distance from a line passing through the center of pins 137 and 138 to the inner wall 140 is 1.601 inches. Box 36 is 0.0725 inches deep at the ends such as 143. The bottom surface 142 is perpendicular to the end 143 for a one-inch distance, then along another approximately one-inch long surface 144 it slopes down to a depth of 0.895 inches. The central surface 145, which is again perpendicular to the end 143, is 0.840 inches across. Channel 55 is 0.244 inches wide and otherwise matches the dimensions of box 36. Walls 147 and 148 which separate box 36 and channel 55 are 0.050 inches thick and there is a 1.5 inch gap between the walls. A rectangular cavity 150 opens off of and is centered with respect to channel 55 to provide room for bulb 33. Cavity 150 is 0.840 inches long, 0.250 inches wide, and as deep as channel 55. Socket 31 is of a size and shape appropriate for engaging socket 32.

Tape compartment 134 includes a tape support 154, four tape guides such as 156, 157, and 158, and end walls 161 and 162. Support 154 has an aperture 20A and a channel 165 in it and raised rails 167 and 168 (FIG. 11) at its sides. Support 154 is 5.835 inches in the horizontal direction in FIG. 6 from end 170 to end 171 and has a width such that it holds tape 22 snugly yet permits it to slide easily, or about 1.780 inches. It is 0.110 inches thick in the area of rail 167 and 0.090 inches thick elsewhere, except under rail 168. The upper surfaces of rails 167 and 168 are 0.650 inches below the upper surface 174 of body 15. The end portions 172 and 173 are curved in a 0.85 inch radius along the rails 167 and 168 and a 0.83 inch radius along the remainder of its width. Both curves drop a vertical distance of 0.120 inches in FIG. 6 to define the length of the arcs. Rails 167 and 168 rise 0.020 inches above the surface 175 (FIG. 11) of support 154, and are 0.130 inches wide. There are gaps, such as 177 (FIG. 6), 0.700 inches wide in rails 167 and 168 directly below the guides, such as 156, 157 and 158. Guides 156, 157 and 158 and the fourth guide which is located in the lower corner of compartment 134 in FIG. 1 and symmetrically placed and shaped with guides 157 and 158 but not shown, are 0.620 inches long in the horizontal direction in FIG. 6 and 0.100 inches wide in the horizontal direction in FIG. 11. The lower edge of each guide, such as 156 and 158 shown in FIG. 11 slopes at 15° toward the compartment wall to a point on the wall that is 0.015 inches above the respective rails 167 and 168. The upper surface in FIG. 11 of each guide is 0.120 inches above its respective rail. There is an opening, such as 178 (FIG. 1), under each guide which is required by the molding process. Each guide is spaced 0.040 inches in the horizontal direction in FIG. 6 from the point where the end pieces 172 and 173 commence and the respective rails 167 and 168 recommence. Aperture 20A extends the length of support 154 between end portions 172 and 173 and is 0.880 inches wide with the ends fully radiused. Channel 165 is 5.580 inches long by 0.220 inches wide by 0.150 inches deep. End walls 161 and 162 are separated along the horizontal by 5.950 inches. The lower portion 163 of wall 161 and wall 162 are symmetrical thus only the dimension of one will be given. Wall 163 defines an arc of 0.750 inches about a point 0.130 inches below point 180 of wall 163 and intersecting point 180, which is 0.475 inches horizontally from end 170 of support 154. Body 15 also includes flange 184 having holes, such as 185, of 0.156 inches diameter, a groove 187 (FIG. 7) which receives end 188 of light guide 50, structure, such as 190 (FIG. 5) for receiving mounting clips to mount the unit in the automobile, and various flanges, such as 191, for strengthening the body portion 15.

Figure 2:
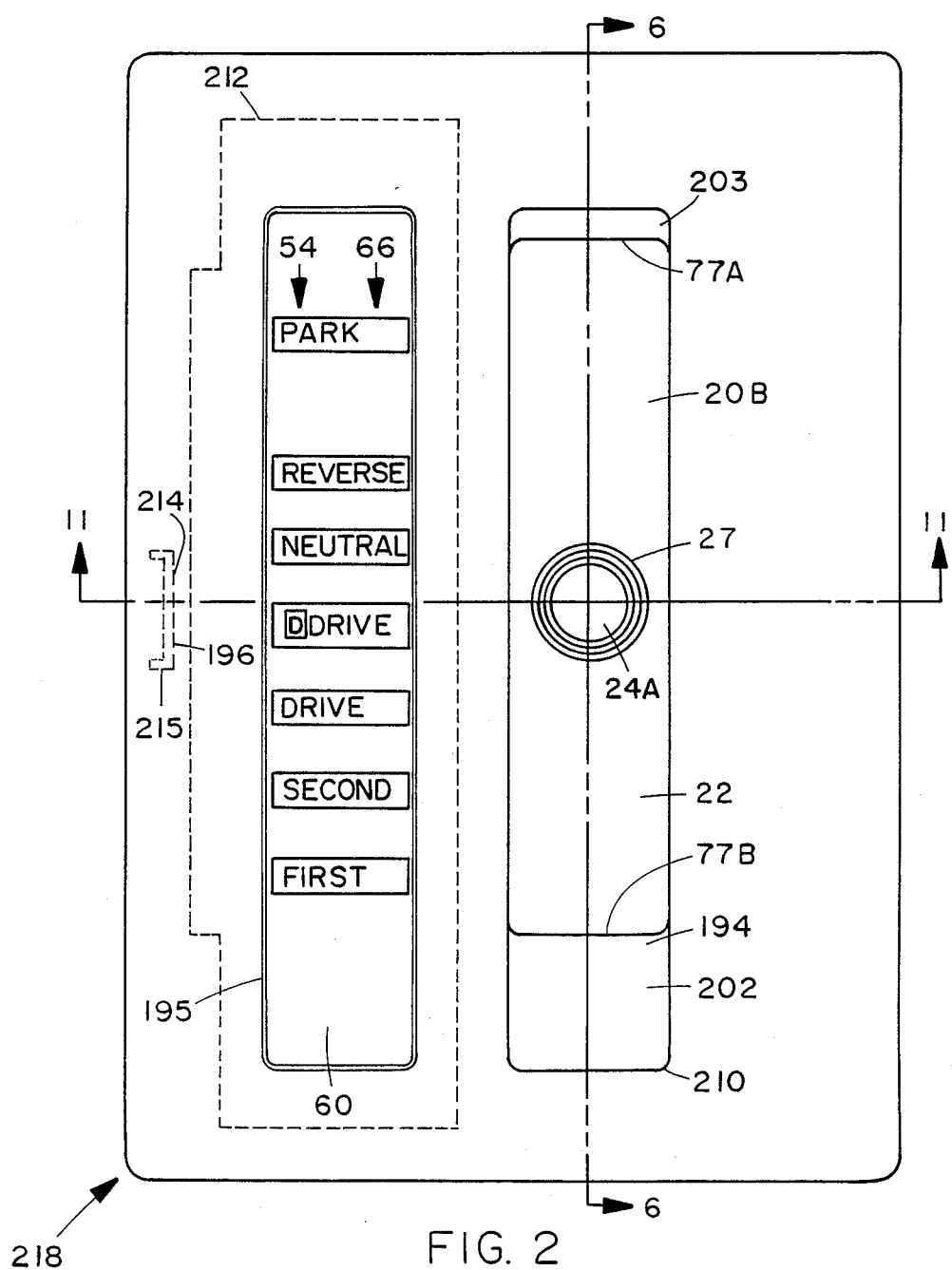
FIG. 2 is a top plane view of the embodiment of FIG. 1.

Cover 16 is shown in FIGS. 1, 2 and 11. It comprises plate 193 (FIG. 11) having window 195 and channels 198 and 199, collar 194 defining aperture 20B, tongue 196, pins, such as 197, stud 200 (FIG. 1) and pin 201 which are all integrally molded of high temperature ABS plastic, preferably black. Plate 193 is of a size suitable for mating with flange 185 of body 15 ith the plate 193 overhanging slightly. Collar 194, which defines aperture 20B, is about 5.910 inches long by 1.120 inches wide where it mates with plate 193, and slopes inward at end 202 (FIG. 2) at 32° to the vertical (the line out of the paper in FIG. 2) for a distance of 0.460 inches (the vertical distance in FIG. 2) while end 203 slopes inward at 15° for a distance of 0.210 inches. Collar 194 extends 0.615 inches from inner surface 205 of plate 193 to tip 206 of lower edge 207. The lower edge 207 slopes at 15° to the horizontal in FIG. 11. Window 195 is 5.910 inches long by 1.088 inches wide. The corners, such as 210 (FIG. 2), of collar 194 and window 195 are rounded in 0.090 inch radii. Pins, such as 197, are 0.125 inches in diameter and 0.185 inches long with 0.020 inches x 45° chamfers at the ends. Tongue 196 (best seen in FIG. 1) is U-shaped with a 0.050 inch-thick wall with the base 214 of the U 0.810 inches wide and the ends 215 and 216 of the U 0.180 inches long. Tongue 196 extends 0.500 inches from the bottom surface 205 of plate 193. Channel 198 is 0.210 inches wide and 5.580 inches long. Channel 199 is 1.360 inches wide and 6.317 inches long. Both channels 198 and 199 are 0.025 inches deep. Stud 200 is integrally formed with one of pins 197, is about 0.400 inches long and 0.060 inches wide, and extends 0.070 inches from surface 205 of plate 193. Pin 201 is 0.090 inches in diameter, extends 0.070 inches from surface 205,a dn has a 0.010 inch x 45° chamfer on its end. In addition, cover 16 is manufactured originally with a bead 212 on under surfacd 205 about the perifery of window 195, but this is melted in sonic welding light guide 50 to cover 16. The wall thickness of cover 16 is generally 0.90 inches, except where otherwise noted above.

The gearshift lever indicating mechanism according to the invention is assembled as follows. Lens 60 is placed in channel 199 in cover plate 193 with slot 61 fitting over stud 200 and hole 63 fitting over pin 201. Light guide 50 is placed over lens 60 with slot 99 fitting over stud 200 and hole 101 fitting over pin 201. The bead 212 mentioned above is then sonically melted to sonic weld guide 50 to cover 16 to form a cover unit 218. The tape 22 is then threaded through slot 230, between tape guides such as 156, 157 and 158 and tape support rails 167 and 168, and through slot 232. Bushing 27 is then placed in hole 124 and retainer ring 28 is sonic welded to it to hold the ring and bushing to the tape 22. Diffuser 34 is placed over light box 36 with pins 137 and 138 on body 15 fitting into holes 38 and 39 in diffuser 34, and the pins 137 and 138 are spin staked to attach the diffuser 34 to the body 15. Hooks 56 and 57 of spring 45 are hooked over legs 87 and 88 of indicator member 40 with portion 57A of hook 57 fitting into joint 95A (FIG. 10B) and portion 57C fitting into joint 95C and V-shaped portion 58 pressed against the surface of prism 84 with the portion 59 extending above the upper edge 240 of the prism. Pins 41 and 42 of indicator member 40 are then pushed into openings 43 and 44 of tape 22. The above-mentioned pre-assembled cover unit 218 is then placed over the body unit with main light guide 52 sliding into channel 55, tongue 196 fitting into cavity 150, the upper end 240 of flange 47 slipping into channel 198, and collar 194 closing the housing about the upper surface of tape 22; further, indicia 54 on light guide 51 align with window panes 66 on lens 60, and channel 165, wall 244, diffuser 34, collar 194, indicia light guide 51 and channel 198 together form an arm support channel means 250 for receiving flange 47; pins, such as 197, of cover 16 fit into holes 185 in body 15; in addition portion 59 of V 58 engages surface 298 of channel 198 and is pushed down against prism 84, placing the indicator member 40 under tension. The pins, such as 197, are spin staked to attach the cover 16 to the body 15. Finally bulb 33 is placed in socket 32 which is inserted in socket 31 to complete the indicator mechanism unit. The indicator mechanism unit is placed in an automotive vehicle by sliding hole 24A in bushing 27 over the gearshift lever, fastening the unit to the gearshift mechanism by screws, and then installing the combined gearshift mechanism and indicator mechanism unit in the vehicle. When the gearshift lever is moved, tape 22 slides in the slot between the guides, such as 156, 157 and 158, and the tape support rails 167 and 168, thereby moving arm 46 behind the appropriate one of panes 66 to indicate the operating position of the lever.

The lower edge 86 of flange 47, the lower edge 207 of collar 194, and the lower edges of guides 156, 157 and 158 are sloped 15° to substantially conform to the slope of tape 22. Tape 22, as most metal tapes, has a small amount of curl about its long axis which inclines the edges slightly. The slope of the above-mentioned lower surfaces 86 allows substantially the entire surfaces to engage the tape, distributing the forces more uniformly and permitting the tape to slide more easily, since the surfaces do not fight the natural shape of the tape. The indicating member 40 may engage the surface 298 at the upper ends 89A and 89B of legs 87 and 88 and along the upper edge 240 of prism 84. However, generally the spring 45 keeps these surfaces spaced slightly from surface 298. These ends 89A and 89B and the upper edge of prism 84, as well as the portion 58 of spring 45, slide in channel 198 in cover 16. Channel 165 in housing body 15 provides clearance for pins 41 and 42 extending through tape 22. Indicating member 40 may engage the lower surface 107 of indicia light guide 51 with boss 79A or the upper surface of diffuser 34 with boss 79B. The fit of flange 47 between surface 298 and tape 22 is relatively snug with the springiness of the tape 22 and spring 45 absorbing tolerance variations, while the fit of bosses 79A and 79B between diffuser 34 and indicia light guide 51 is relatively loose to prevent binding. Likewise the fit of flange 47 in channel 250 in the horizontal direction in FIG. 11 is loose to avoid binding or catching due to tolerance variations. This loose fit horizontally in channel 250 and vertically between diffuser 34 and guide 51 can lead to rattling of the indicator arm, particularly since the connection to the gear mechanism is not a rigid one. Spring 45, however, keeps the indicator arm under tension tending to rotate boss 79B into diffuser 34, thus preventing any rattling.

The light from bulb 33 is guided in the indicator mechanism as follows. The main light guide 52 distributes the light along prism 125, extensions 127 and 128, prism 124 and the upper surface 110 of indicia light guide 51 along flange 97. The matt finish of the bottom edge of main light guide 52 reflects most light that reaches it back toward the above-mentioned areas. Prism 125 reflects light into the end 49 of indicating arm 46. The light near the center of main light guide 52 is more intense than the light farther away from the center, therefore extensions 127 and 128 interrupt prism 125 opposite the "NEUTRAL" and "D" "DRIVE" indicia to prevent the arm 46 from being visibly brighter when aligned with these indicia. The light incident on prism 124 is primarily diverging from bulb 33 and thus the prism scatters it out toward all of the indicia 54. Prism 124 and the rest of the edge where guide 51 meets guide 52, and other features discussed below, are adjusted to distribute the light from bulb 33 uniformly over the indicia 54.

Indicating arm 46 is a double-ended light funnel. It includes a first wider portion, end 49, and a second wider portion 80 both of which gather light from a larger area and funnel it to a smaller area, i.e. the cross-sectional area of the arm 46 between them. Light passing through indicia light guide 51 exits edge 129 (FIG. 9C) and reflects off prism 84 and again off prism 90 into funnel 80 which guides it into arm 46. Thus the indicating arm 46 is lighted from both ends resulting in much more uniform distribution of light than in prior art indicating mechanisms. The funnel 80 gathers light from a larger area than the funnel end 49 since the light is more intense at end 49. Tongue 196 is black, as is all of cover 16, and extends down into the upper portion of cavity 150, preventing light from bulb 33 from reflecting off the wall of cavity 150 and then passing through the transparent light guide 50 and out through window panes 66, thereby making a "hot spot" in the windows.

Relating the above to the language of the claims: aperture means 20 (FIG. 11) comprises apertures 20A and 20B; arm support means 270 comprises flange 47, tape 22, housing body 15, cover 16, light guide means 50, and diffuser 34; tape means 271 (FIG. 1) includes tape 22, bushing 27, and retainer 28; tape support means 273 includes tape support 154 and body 15 in general; means 275 for securing comprises flange 47, pins 41 and 42, openings 44 and 43 and tape support 154; and fastening means 277 includes means 275 plus flange 184, hole 185, and pins, such as 197.

The means 280 for moving the indicating arm 46 comprises tape means 271, flange 47, and pins 41 and 52; in the broadest sense the background means 300 comprises diffuser 34, the indicating arm 46, and the means for moving 280; illuminating means 282 comprises light 30, guide means 50, flange 47 and light box 36; means 283 for illuminating elongated member 46 from both ends comprises light 30, guide means 50, and flange 47; and the means 47A for guiding the light that passes through the indicia light guide 51 into the indicating arm 46 comprises flange 47 and prisms 84 and 90 in particular.

The indicating member support means 290 comprises tape means 271, diffuser 34, cover 16 and the other housing 14 portions that support these parts and maintain their spatial relationships. Bias means 292 comprises spring 45 and the portion 298 of cover 16 which presses against it to create a bias force that prevents the indicating member 40 from rattling.

The axis along which the tape 22 and indicator arm 46 move which is referred to in the claims is the axis in and out of the paper in FIG. 11. In this discussion "axis" is used in its broadest sense, meaning the main line of motion of the parts. The axis of movement of the tape and arm may be referred to as the "first axis" to distinguish it from a second axis which is used to refer to motion in the vertical directions in FIG. 11 and a third axis which is used to refer to motion along the horizontal directions in FIG. 11. The "first direction", which may be referred to elsewhere in the claims in connection with the support of the tape 22 and the securing of the arm 46 and flange 47, is the upward vertical direction in FIG. 11, while the second direction is the vertical downward direction in FIG. 11.

A feature of the invention is the fact that the indicator mechanism is entirely enclosed. The design permits collar 194 to press down against tape 22, and still permits the tape to move easily. The design aspects that make this possible include the sloped surfaces of edges 207, rails 167 and 168, and guides, such as 156, the narrow surface areas of these parts, and the curved ends 172 and 173 of support 154. With this design, the housing conforms to the natural curl of the tape and the tape contacts only a small area of the housing, resulting in low friction. Collar 194 actually presses down slightly on tape 22 to hold it in place, with the curl of the tape about its long axis providing resiliency and permitting some adjustment for variations within tolerances. There is a small clearance at the ends 77A and 77B, (FIG. 2), but because of the extension of the tape well beyond the ends 77A and 77B, the gap between the ends 77A and 77B and the tape is not visible from any external viewpoint and no direct line access to the inside of the indicator housing is provided to dirt and other objects. The curvature and placement of ends 172 and 173 result in a smooth feed of the tape 22 from coils 75A and 75B into the slot between the guides, such as 156, and the rails 167 and 168. In prior art tape mechanisms, the curvature of the tape caused it to overshoot the support surface and required a reverse curvature to come back down to the surface and slip into the slot that held it. This reverse curve caused binding of the tape, and thus significant clearance between the tape and the housing slot through which it passed was required for easy movement of the tape. The curved ends 172 and 173 and the spacing of the guides, such as 156, from these ends permits the tape to flatten itself on the rails before passing under the guides.

A related feature of the invention is its excellent performance under a test referred to in the trade as the soft drink test. In this test a soft drink is spilled over the indicator and allowed to dry. The indicator must not stick afterwards. First the design tends to cause the fluid to flow under the small gap at the ends 77A and 77B of collar 194 and roll down the coils 75A and 75B out of the indicator mechanism at slots 230 and 232. Second, the contact areas between the tape 22 and the housing 14 are so small that the adhesive effect of the dried soft drink is easily overcome.

Another feature of the invention is the fact that the tape both closes the aperture 20 and connects the gearshift lever to the indicator member 40. In the prior art the connection between the gearshift mechanism and the indicator arm was often made of rigid members, as this was thought to be desirable in order to obtain acceptable indicator arm alignment over long periods of operation. However, a tape, such as 22, by its very nature, is not rigid. In addition it had other properties, such as its inherent curl mentioned above and the need for support and guidance to keep it flat which appeared to argue against connecting the indicator arm to it. However, by using only minimal connection between the arm 46 and tape 22, i.e. pins 41 and 42, making the connection a loose one, and using the housing 14 itself as the securing and stabilizing mechanism, these problems were overcome.

Another feature of the invention is the high visibility of the indicator, in a mechanical sense (as compared to an optical sense which shall be discussed below). That is, the mechanical parts and their mechanical arrangement provide enhanced visibility. Automobile gearshift indicators must deal with a significant uncertainty in the position of the gearshift mechanism with respect to the car body. This is due to the relatively large tolerances in gearshifts and car bodies. Prior art indicators solve this problem by making the indicator arm very narrow and the indicia relatively broad. Thus over a wide range of gearshift lever positions within tolerances, the arm will lie behind or in front of the proper indicia. The same problem is solved by the present invention in a wholly different manner. Here the indicator arm is made broad, each indicia is placed in a separate window pane 66, and the panes are separated by opaque areas of about the same width as the panes. Thus variations in gearshift position are absorbed by variations in the position of the edges of the arm behind the opaque areas, which variations are not visible. This has several advantages: first since the indicator arm is much broader it is more easily visible; second, because the background color and the indicating arm substantially fill the entire area behind the pane, strong contrast between the selected and non-selected indicia is provided; third in the preferred embodiment the parts are dimensioned so that the entire background area behind the pane of the selected indicia is always completely filled, thus the indicator is never seen to be slightly (or more than slightly) off center as in the prior art mechanisms, which is aesthetically much more pleasing.

Several other features of the invention are related to the lighting and optics of the indicating assembly. One such feature is the fact that the indicia, the indicating arm, and the background of the indicating arm are all substantially uniformly lighted by a single light source. The term "single light source" is intended to include a plurality of bulbs or other light sources which are physically close enough as to appear to originate from the same source, but to distinguish a plurality of bulbs or other light sources where each bulb or source is intended to primarily light a different part of the assembly. By "substantially uniformly" is meant that the lighting appears uniform to the casual user of the indicator assembly; that is, the background lighting does not visibly vary within a pane or from one pane to the next, and the indicator does not have "hot spots" at the edges or portions nearer the light, and the indicia lighting under casual observation does not visibly vary from one letter to the next or from one pane to the next. Note that "substantially uniformly" does include the possibility that the indicia at which the indicator arm is located may appear brighter or otherwise different than the other indicia, and the possibility that the background, the indicia, and the indicating arm may have apparent differences in lighting as to each other. A feature related to the uniformity of lighting is the design which lights the indicating arm from each of its ends. The light entering funnel 80 has traveled farther and dissipated more than the light entering end 49; however, the funnel 80 gathers light from a larger area than end 49 increasing the light entering the arm at about 78. The taper of the arm 46 in the area from about 0.515 inches from the end to 1.315 inches from the end also serves to enhance the uniformity. Some light also enters the side of indicator arm 46 when it is away from the center position, which also tends to make the lighting more uniform. Another feature related to the lighting is that the light is transmitted both through the indicator arm and the background. The sum of the mechanical visibility and the lighting and optical features discussed above is that the indicator mechanism according to the invention provides an aesthetically very pleasing appearance. When the lever is shifted, it seems that a background light of one color in a pane is shut off and one of another color is lighted, as though the indicator is electronic. Thus the mechanism provides all the advantages of an electronic indicator in a simple mechanical system.

The above-described features result in an indicator with a sophisticated, pleasing appearance that is highly desirable in quality automobiles. However, the solution to the mechanical linkage problem results in a relatively loose and flexible (though reliable) connection between the indicator arm and the gearshift lever. This could result in rattling of the indicating arm within the housing, which is not desirable in a quality automobile. Another feature of the invention is that this problem was solved with a single small piece of spring wire. This single wire prevents rattling along all three orthogonal axes; i.e. the axis into the paper in FIG. 11 and the vertical and horizontal axes in the same FIG., which directions are orthogonal to each other. A related feature is that the prism 84 which functions optically as discussed above also performs the mechanical function of providing the surface on which the spring 45 acts to prevent rattling. The 45° angle of the prism 84 causes the action of the spring against the surface to have a component along both the horizontal and vertical axes in FIG. 11. Since the portion 59 of the spring is compressed against the surface 298 of cover 16 in channel 198, it will also frictionally resist undesirable motion in the third orthogonal direction along the tape.

Still another feature of the invention is the fact that the optical parts perform both mechanical and optical functions. The light guide 50 and indicator member 40 perform both light and mechanical guiding functions. This greatly simplifies the mechanism. A related feature is the ease of manufacture, installation and repair. A relatively small number of assembly operations are required due to the small number of parts and few fastening operations. The only failure mode of any significant degree of probability is the failure of the single bulb, which is easily replaced. This results in a much higher reliability than the prior art electronic indicator assemblies.

A novel gearshift lever operating position indicating mechanism has been described that provides both the simplicity and reliability of mechanical indicating mechanisms and the sophisticated, aesthetically pleasing appearance of electronic assemblies, and which has numerous other features. It is evident that those skilled in the art may now make numerous uses and modifications of and departures from the specific embodiment described without departing from the inventive concepts. For example, now that it is seen that the problems associated with connecting the indicating arm to the gearshift mechanism via a tape can be solved, other equivalent structures can be devised to do the same thing. Or now that it has been shown that an indicating assembly as aesthetically pleasing as an electronic one can be illuminated with a single bulb, other structures can be designed to do this also. Likewise, now that it has been shown that the rattling problem can be overcome with an inexpensive bias means 292, other equivalent solutions can be made. Similarly, many other of the parts described can be replaced with equivalent parts. Additional functions may be added. Consequently, the invention is to be construed as embracing each and every novel feature and novel combination of features present in or possessed by the indicating mechanism described.

What is claimed is:

1. A gear shift lever operating position indicating mechanism comprising:
   a housing having a window in it and having aperture means for passing said shift lever through it, said housing including a body portion and a cover portion;
   indicia means for labeling the operating positions of said gear shift lever;
   an indicting arm; and
   arm support means for movably supporting said indicating arm within said housing over a range of movement that permits the arm to be visually aligned in said window with said indicia means, said arm support means including:
   tape means for moving with said lever to close said aperture means and for connecting said indicating arm to said lever, whereby said arm moves with said lever to indicate the operating position of the lever;
   tape support means for permitting movement of said tape along an axis while relatively rigidly supporting it in a first direction substantially perpendicular to said axis;
   a flange integrally formed with and at right angles to said arm;
   channel means extending from said tape to said cover to receiving said flange; and fastening means for securing said cover to said body and preventing movement of said flange in a second direction opposite to said first direction, whereby said flange is constrained to move in said channel between said cover and said tape thereby supporting said arm while permitting it to move along said axis.

2. A mechanism as in claim 1 wherein said fastening means includes a pin connected to said arm and an opening in said tape for receiving said pin.

3. A mechanism as in claim 2 wherein said flange connects said arm and pin.

4. A mechanism as in claim 2 wherein said fastening means includes two of said pins and two of said openings.

5. A gear shift lever operating position indicating mechanism comprising:
   a housing having a window in it and having an aperture means for passing said shift lever through it;
   indicia means for labeling the operating positions of said gear shift lever;
   an indicating arm made of a light guide material;
   a light source; and
   arm support means for movably supporting said indicating arm within said housing over a range of movement that permits the arm to be visually aligned in said window with said indicia means, said arm support means including:
   tape means for moving with said lever to close said aperature means and for connecting said indicating arm to said lever, whereby said arm moves with said lever to indicate the operating position of the lever; and
   guide means for guiding light form said light source into said arm and for mechanically guiding the movement of said arm, said guide means including a member made of light guide material, wherein both said light guiding function and said mechanical guiding function are performed by said member.

6. A gear shift lever operating position indicating mechanism comprising:
   a housing having a window in it and having aperture means for passing said shift lever through it;
   indicia means for labeling the operating positions of said gear shift lever;
   an indicating arm;
   arm support means for movably supporting said indicating arm within said housing over a range of movement that permits the arm to be visually aligned in said window with said indicia means, said arm support means including:
   tape means for moving with said lever to close said aperture means and for connecting said indicating arm to said lever, whereby said arm moves with said lever to indicate the operating position of the lever, said tape means including a tape; and
   a plurality of rails supporting said tape.

7. A mechanism as in claim 6 wherein said arm support means further includes a collar defining said window and having a plurality of narrow edges, and wherein said tape is held between said rails and said narrow edges.

* * * * *